United States Patent

Tinsley et al.

[15] 3,659,881
[45] May 2, 1972

[54] COUPLING CONNECTOR

[72] Inventors: Cleere B. Tinsley; Edward K. Graham, Jr., both of Houston, Tex.

[73] Assignee: Seabek Products, Inc., Houston, Tex.

[22] Filed: Mar. 2, 1970

[21] Appl. No.: 15,323

[52] U.S. Cl. ................. 285/249, 285/331, 285/343, 285/371
[51] Int. Cl. ................................................. F16l 33/00
[58] Field of Search ............ 285/331, DIG. 19, 347, 343, 285/249, 174, 371, 382.7, 354

[56] References Cited

UNITED STATES PATENTS

| 546,314 | 9/1895 | Forrey | 285/371 |
|---|---|---|---|
| 2,821,567 | 1/1958 | Bergon | 285/249 X |

FOREIGN PATENTS OR APPLICATIONS

| 6,712,123 | 3/1968 | Netherlands | 285/354 |
|---|---|---|---|
| 476,249 | 9/1969 | Switzerland | 285/343 |
| 847,063 | 9/1960 | Great Britain | 285/249 |
| 100,186 | 4/1962 | Norway | 285/249 |

*Primary Examiner*—Dave W. Arola
*Attorney*—Pravel, Wilson & Matthews

[57] ABSTRACT

A coupling connector between a tube and a coupling body wherein an annular recess is formed in the coupling body to receive the tube, and wherein the tube is frictionally engaged and forced longitudinally against an annular seal located in the annular recess in the coupling body to form an effective pressure seal between the tube and the coupling body.

6 Claims, 3 Drawing Figures

Patented May 2, 1972

3,659,881

Cleere B. Tinsley
Edward K. Graham, Jr.
INVENTORS

BY

Pravel, Wilson & Matthews
ATTORNEYS

COUPLING CONNECTOR

BACKGROUND OF THE INVENTION

The field of the present invention is coupling connectors.

In the past, efforts have been made to solve the problem of forming a pressure-tight connection between a tube and a coupling body. This problem is accentuated when the tube and coupling body have smooth unthreaded surfaces engaging each other. Some of the prior patents dealing with this problem are U.S. Pat. Nos. 2,951,715; 3,218,094; 3,291,510; 3,404,905 and 3,454,290.

Such prior patents have approached the problem of sealing the tube to the coupling body on the basis of radially squeezing the tube into sealing contact with the metal. Such sealing efforts are often unsatisfactory because they depend upon the material of the tube deforming adequately enough to seal. Also, most of the prior patents have employed clamping devices which are crimped or bent in use so that they cannot be reused in the event the coupling is disconnected.

SUMMARY OF THE INVENTION

It is an object of the present invention to provide a new and improved coupling connector, which is especially suitable for unthreaded tubing.

It is another object of the present invention to provide a new and improved coupling connector for tubing which can be connected and subsequently disconnected without damaging or substantially deforming the components of the structure so that the coupling may be reconnected using the same components.

Briefly, the present invention relates to a coupling connector for frictionally engaging and forcing a tube longitudinally against an annular seal located in an annular recess in a coupling body to form an effective pressure seal without appreciable damage or distortion of the tube or parts of the coupling connector. An additional squeezing seal and clamping action is also provided by the connector.

DESCRIPTION OF THE PREFERRED EMBODIMENT

Figure 1:
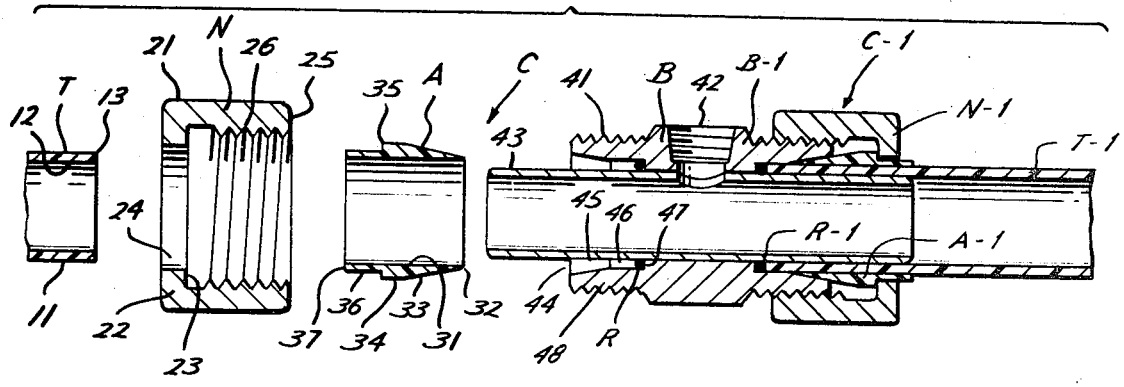
FIG. 1 is a cross-sectional view of a double coupling connector according to the present invention, with one end thereof being an exploded view, and with the other end being an assembled view forming a pressure seal according to the present invention.

Referring to FIG. 1, there is depicted at C an exploded cross-sectional view of a section of tubing T, a coupling nut or forcing means N, an annular sleeve or gripping means A, a coupling body B and an annular seal R. The tubing T with an exterior surface 11 and an interior surface 12 and an end 13 used in the present invention may be a plastic tube or pipe, made preferably of a synthetic resin, for example polyethylene. The coupling body B and the nut N are preferably made of metal, for example brass. The nut N is preferably polygonal (e.g., hexagonal) in axial cross-section to facilitate rotation, having at an end 21 an annular clamping shoulder 22 with an interior surface 23 which engages annular sleeve A (in a manner to be set forth hereinafter) through an opening 24 in which tubing T passes to be engaged with the coupling body B. An opposite end 25 of the coupling nut N is threaded along an interior surface 26 to engage coupling body B in a manner to be set forth hereinafter. The annular sleeve A is made from a material which is harder than the tubing T while not being so much harder than tubing T that it will deform tube T. An example of a type material which is suitable for the present invention is an acetal resin or thermoplastic polymer, such as that sold under the trademark "DELRIN" by DuPont.

An interior surface 31 of the annular sleeve A is dimensioned to allow passage of the tubing T through the annular sleeve A, but to also frictionally engage along the surface 31 the exterior 11 of the tube T when the coupling connection of the present invention is being formed. An exterior surface of annular sleeve A consists of a radial flat surface 32, a tapered or conical surface 33 which engages coupling body B in a manner to be set forth hereinafter, a circumferentially flat surface 34, a circumferential lip 35 which engages interior surface 23 of annular clamping shoulder 22 of coupling nut N, and another circumferentially flat surface 36 and radial flat surface 37 which extend into the opening 24 of coupling nut N.

The coupling body B is threaded along an exterior surface 41 to engage the threaded interior 26 of coupling nut N. While coupling connector D shown in FIG. 1 illustrates a double coupling connector with a threaded opening 42 in the coupling body B, the coupling connector may provide only a single connection or coupling between a tube and a coupling body. For example, the coupling body B could be modified to provide a coupling connector at one end only, and with a standard male or female threaded connection at the other end for connection to a faucet or some other suitable device. Additionally, although the coupling body B depicted in FIG. 1 is shown as consisting of an inner tube 43 inserted into an attached by a press fit to the outer body B, this is not intended as a limitation, as the coupling body B could be cast or otherwise be formed as one piece of metal or other suitable material, so long as the coupling body B has the annular recess hereinafter described for receiving the tube T.

Although the structural components have been set forth hereinabove as being preferably made of certain materials, the materials set forth are to be deemed as being exemplary only. The only structural limitation which the coupling connector of the present invention imposes on the materials usable therein is that the coefficient of friction between the surface 31 of annular sleeve A and the exterior surface 11 of tubing T must exceed the coefficient of friction between the interior surface 12 of the tubing T and the inner tube 43 of the coupling body B, so that the tubing T can be moved longitudinally relative to the tube 43 by moving the annular sleeve A, as will be more evident hereinafter.

An annular walled recess 44 consisting of a tapered or conical cam wall 45 and an annular wall portion 46 and a terminating end wall 47 is located between the inner metal tube 43 and a wall 48 of coupling body B interiorly of its threaded portion 41. The annular seal R, which may be an O-ring made of rubber or other resilient material, is inserted into the annular recess 44 so as to be situated against the terminating end wall 47.

Figure 2:
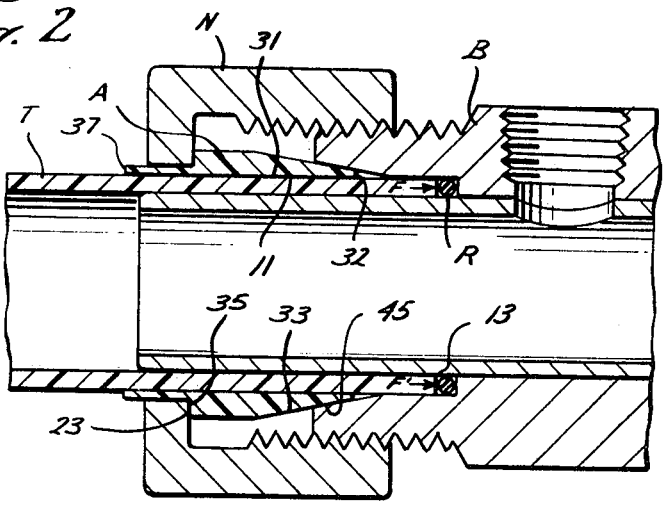
FIG. 2 is an enlarged cross-sectional view of a partially assembled portion of the coupling connector of FIG. 1.
Figure 3:
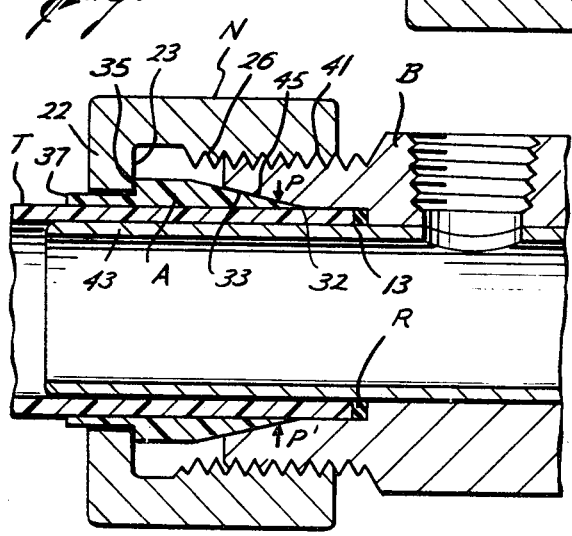
FIG. 3 is a view similar to FIG. 2 but showing the coupling connector in the final assembled sealing position.

In the operation or use of the invention, a coupling connection is formed at the connector C by inserting the annular seal R against the terminating end wall 47 of the annular recess 44 of coupling body B and then inserting tubing T through the opening 24 in coupling nut N, then sliding the annular sleeve A over the end of the tube T which has passed through the opening 24 until the circumferential lip 35 engages the interior surface 23 of the clamping shoulder 22, and thereafter sliding tubing T axially or longitudinally onto inner metal tube 43 until the end 13 of the tubing 10 contacts the annular seal R (FIG. 2). The coupling nut N is then connected to coupling body B by rotating coupling nut N so as to engage threads 26 of coupling nut N with the threads 41 of coupling body B (FIG. 2). As the coupling nut is threaded on coupling body B, the longitudinal movement of the nut N is transmitted to the sleeve A by reason of the engagement of the interior surface 23 of the clamping shoulder 21 with the circumferential lip 35 of the annular sleeve A. As the sleeve A is moved longitudinally, the frictional engagement between its inner surface 31 and the external surface 11 of the tube T is increased due to the wedging and squeezing action caused by the tapered surface 33 moving longitudinally relative to the tapered cam wall 45. When such frictional engagement is sufficient, the tube T is thereafter moved longitudinally by the sleeve A as the nut N is threaded further onto the body B. Only a relatively short amount of such longitudinal movement of the tube T forces its ends 13 tightly against the O-ring R to distort same and form the pressure seal in the coupling connector of the present invention (FIG. 3). It will be noted that the O-ring R is enclosed by the end 13 of tube T, the terminating end wall 47, the inner metal tube 43, and the annular wall portion 46 of the annular recess 44, so that upon compression by the tube T, it forms a seal in such area. The end 13 of tube T should be in a plane which is substantially perpendicular to the longitudinal axis of tube T to insure an effective seal with the annular seal R.

The double connector D has a second connector C–1 at the other end from the connector C and which preferably is a duplicate thereof, having a section of tubing T–1 engaging an annular seal R–1 in an annular recess of a coupling body B–1 under forces exerted by a coupling nut N–1 and an annular sleeve A–1 to a pressure seal in the same manner as heretofore described in connection with the connector C.

Referring now to FIG. 2, two arrows F and F' represent the force created as the end 13 of tubing is forced longitudinally against the annular seal R as coupling nut N is tightened onto coupling body B, as hereinabove explained. The force exerted by the annular sleeve A on the tubing T is increased by further tightening the coupling nut N onto the coupling body B, from the position shown in FIG. 2 to the position shown in FIG. 3, thereby effecting the pressure seal of the coupling connection, and also performing a clamping function to hold the tubing T after the pressure seal has been effected. Such clamping force, indicated by the two arrows P and P' in FIG. 3, squeezes or compresses the annular sleeve A against the tubing T in a direction normal to the axis of tubing T, thus creating a secondary seal in addition to the O-ring seal, as well as the clamping effect mentioned above.

Since the sleeve A and the tubing T are substantially undamaged as a result of the aforesaid sealing and clamping action, the parts may be disassembled and reused in the same connector C or in another connector. The O-ring R may have to be replaced in some instances, but usually, it can also be reused if desired.

It will be appreciated that the connector C–1 is connected and disconnected in the same manner as the connector C so that they are joined as the double connector D with the tubes T and T–1 in axial alignment.

The foregoing disclosure and description of the invention are illustrative and explanatory thereof, and various changes in the size, shape, and materials as well as in the details of the illustrated construction may be made without departing from the spirit of the invention.

We claim:

1. A coupling connector for tubing comprising:
    a coupling body having an annular recess, with an inner wall and an outer wall and an end wall, receiving an end of a length of tubing therein;
    said coupling body having an inner tube forming the inner wall of said annular recess and disposed inwardly of the tubing;
    said inner tube of the coupling body having an external diameter substantially equal to the internal diameter of the tubing;
    said outer wall of said annular recess having an internal diameter substantially equal to the external diameter of the tubing;
    an annular seal in said annular recess and disposed axially inwardly of the end of the tubing and adapted to be engaged between the end of the tubing and said inner wall, said outer wall and said end wall to form a pressure seal;
    an annular gripping sleeve means externally of the tubing and having its inner surface with an inner diameter substantially equal to the external diameter of the tubing and frictionally engaging the external surface of the tubing for imposing a frictional force between said sleeve means and the tubing for transmitting longitudinal movements of said sleeve means to the tubing during formation of the pressure seal;
    said annular gripping sleeve means and said coupling body having coacting tapered surfaces engageable with each other for converting the axial movement of said annular gripping sleeve means into a force component normal to the axis of the tubing thereby exerting a clamping force between the tubing and said coupling body and increasing the frictional force exerted by said annular gripping sleeve means on the tubing during formation of the pressure seal;
    forcing means operably connected with said gripping sleeve means to force same axially to thereby force the tubing axially relative to said coupling body and force the end of the tubing into sealing engagement with said annular seal;
    the coefficient of friction between the tubing and said inner tube being less than the coefficient of friction between said sleeve and the tubing to cause the tubing to move with said sleeve relative to said inner tube upon an axial movement of said forcing means and said sleeve.

2. The structure of claim 1, wherein said tapered surface on said coupling body comprises:
    a cam wall engageable with said tapered surface of said annular sleeve, said cam wall imparting said force normal to said tapered surface of said annular sleeve upon tightening of said coupling nut to said coupling body.

3. The structure of claim 2, wherein said annular sleeve includes:
    an external lip engageable by said forcing means for the transmission of the axial movement of said forcing means to said annular sleeve.

4. The structure of claim 3, wherein said forcing means includes:
    a threaded nut threadedly mounted on said coupling body and having a clamping shoulder engaging said external lip of said annular sleeve for transmitting axial movement of said nut to said sleeve.

5. The structure set forth in claim 1, wherein:
    said seal is an O-ring of a soft, resilient material capable of being deformed by engagement therewith of the end of the tubing and the axial forcing of such tubing end relative to said end wall of said coupling body; and
    the end of the tubing being in a plane which is substantially perpendicular to the axis of the tubing.

6. The structure of claim 1, wherein said coupling body is a double coupler for the ends of two lengths of tubing in axial alignment with each other and includes:
    a second annular recess, with an inner wall and an outer wall and an end wall, in said coupling body receiving an end of a second length of tubing therein;
    said coupling body having a second inner tube forming the inner wall of said second annular recess and disposed inwardly of the second length of tubing;
    said second inner tube of the coupling body having an external diameter substantially equal to the internal diameter of the second length of tubing;
    said outer wall of said second annular recess having an internal diameter substantially equal to he external diameter of the second length of tubing;
    a second annular seal in said second annular recess and disposed axially inwardly of the end of the second length of tubing and adapted to be engaged between the end of the second length of tubing and said inner wall, said outer wall and said end wall in said second annular recess to form a pressure seal;
    a second annular gripping sleeve means externally of the second length of tubing and having its inner surface having an inner diameter substantially equal to the external diameter of the second length of tubing and frictionally engaging the external surface of the second length of tubing for imposing a frictional force between said second sleeve means and the second length of tubing for transmitting longitudinal movement of said second sleeve means to the second length of tubing;
    said second annular gripping sleeve means and said coupling body having coacting tapered surfaces engageable with each other for converting the axial movement of said second annular gripping sleeve means into a force component normal to the axis of the second length of tubing thereby exerting a clamping force between the second length of tubing and said body and increasing the frictional force exerted by said second annular gripping sleeve means on the second length of tubing during formation of the pressure seal; and second forcing means operably connected with said second annular gripping sleeve means to force same axially to thereby force the second length of tubing axially relative to said coupling body into sealing engagement with said second annular seal.

* * * * *